US011932210B2

(12) United States Patent
Christ

(10) Patent No.: US 11,932,210 B2
(45) Date of Patent: Mar. 19, 2024

(54) DRIVE TECHNOLOGY FOR VEHICLE TREATMENT INSTALLATIONS, IN PARTICULAR WASHING INSTALLATIONS

(71) Applicant: OTTO CHRIST AG, Benningen (DE)

(72) Inventor: Markus Christ, Memmingen (DE)

(73) Assignee: OTTO CHRIST AG, Benningen (DE)

( * ) Notice: Subject to any disclaimer, the term of this patent is extended or adjusted under 35 U.S.C. 154(b) by 663 days.

(21) Appl. No.: 16/972,359

(22) PCT Filed: Jun. 6, 2019

(86) PCT No.: PCT/EP2019/064878
§ 371 (c)(1),
(2) Date: Dec. 4, 2020

(87) PCT Pub. No.: WO2019/234192
PCT Pub. Date: Dec. 12, 2019

(65) Prior Publication Data
US 2021/0170996 A1    Jun. 10, 2021

(30) Foreign Application Priority Data

Jun. 6, 2018 (DE) ...................... 20 2018 103 154.6

(51) Int. Cl.
*B60S 3/04* (2006.01)
*B60S 3/06* (2006.01)
(Continued)

(52) U.S. Cl.
CPC ............... *B60S 3/06* (2013.01); *B60S 3/042* (2013.01); *H02K 5/15* (2013.01); *H02K 21/12* (2013.01); *H02K 2213/12* (2013.01)

(58) Field of Classification Search
CPC ............ B60S 3/04; B60S 3/06; A46B 13/02
See application file for complete search history.

(56) References Cited

U.S. PATENT DOCUMENTS 1,298,096 A * 3/1919 Roberts ................... B60S 3/063
15/302
4,192,036 A    3/1980 Heymann
(Continued)

FOREIGN PATENT DOCUMENTS

CN    205613749 U    10/2016
CN    205 989 729 U    3/2017
(Continued)

OTHER PUBLICATIONS

Ketterer t-Rex-I-65-86 Datenblatt 3206.75-01/20151210. B. Ketterer Söhne GmbH & Co. KG. URL:https://www.ketterer.de/media/3206-bldc-torque-motor.pdf [abgerufen am May 22, 2019].

*Primary Examiner* — Michael D Jennings
(74) *Attorney, Agent, or Firm* — McGlew and Tuttle, P.C.

(57) ABSTRACT

A drive technology for vehicle treatment installations. The drive technology comprises a washing installation drive motor (2) for a vehicle treatment system (69). The washing installation drive motor (2) is preferably configured as a synchronous motor, in particular as a brushless DC motor. The drive motor (2) has an internal rotor (3) with a hollow shaft (5). As an alternative, or in addition, the washing installation drive motor (2) is configured as a modular drive unit (7). The modular drive unit (7) has a uniform configuration and is provided and configured for driving different apparatus constituent parts of a washing installation. The drive technology further includes a washing installation drive (1), a treatment element (52, 55, 57, 64) and also a vehicle treatment system (60) with a corresponding washing installation drive motor (2), and an associated operating method.

20 Claims, 6 Drawing Sheets

(51) Int. Cl.
   *H02K 5/15*       (2006.01)
   *H02K 21/12*      (2006.01)

(56) References Cited

U.S. PATENT DOCUMENTS

| | | | | |
|---|---|---|---|---|
| 4,299,003 A * | 11/1981 | Ennis | ................ | B60S 3/063 |
| | | | | 15/DIG. 2 |
| 4,935,982 A * | 6/1990 | Ennis | ................ | B60S 3/063 |
| | | | | 15/DIG. 2 |
| 11,808,781 B2 * | 11/2023 | Martin | ................ | G01P 5/14 |
| 2005/0268411 A1 * | 12/2005 | Ennis | ................ | B60S 3/063 |
| | | | | 15/53.2 |
| 2006/0065292 A1 | 3/2006 | Moore | | |
| 2016/0311408 A1 * | 10/2016 | Belanger | ............. | B60S 3/063 |

FOREIGN PATENT DOCUMENTS

| | | | |
|---|---|---|---|
| DE | 2733091 A1 | 1/1979 |
| DE | 19925765 A1 | 12/2000 |
| DE | 202005019329 U1 | 4/2007 |
| DE | 202008012139 U1 | 2/2010 |
| DE | 102009029877 A1 | 12/2010 |
| DE | 202013100943 U1 | 6/2014 |
| DE | 202015100711 U1 | 5/2016 |
| DE | 202016101927 U1 | 7/2017 |
| EP | 1058370 A2 | 12/2000 |
| EP | 1612919 A2 | 1/2006 |
| EP | 3258572 A1 | 12/2017 |

* cited by examiner

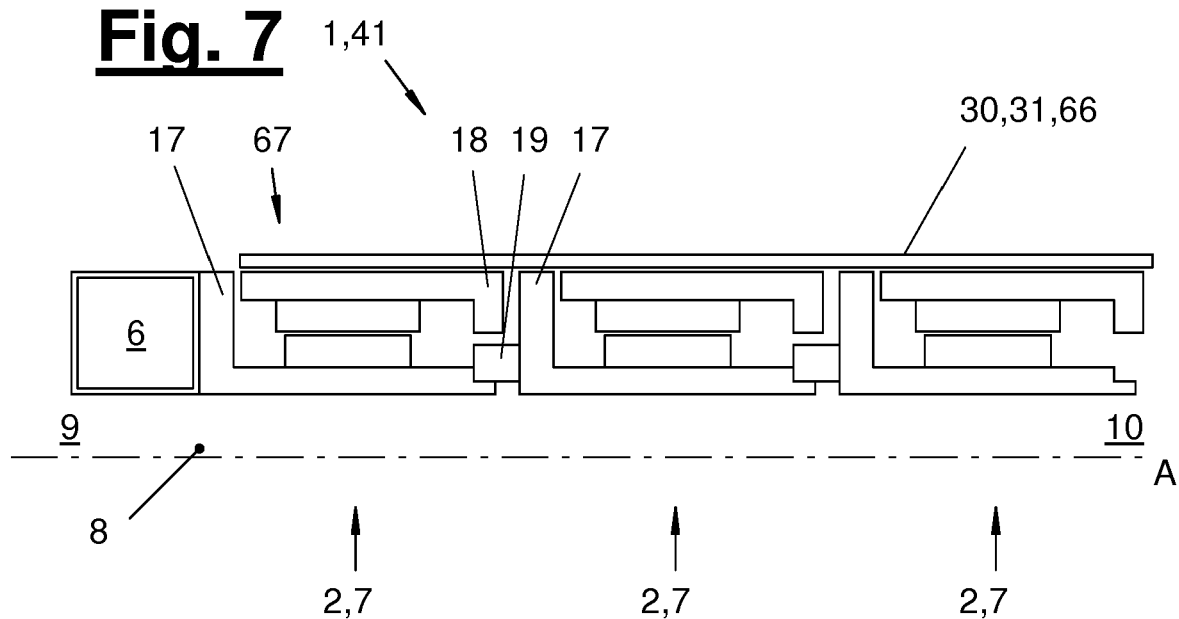
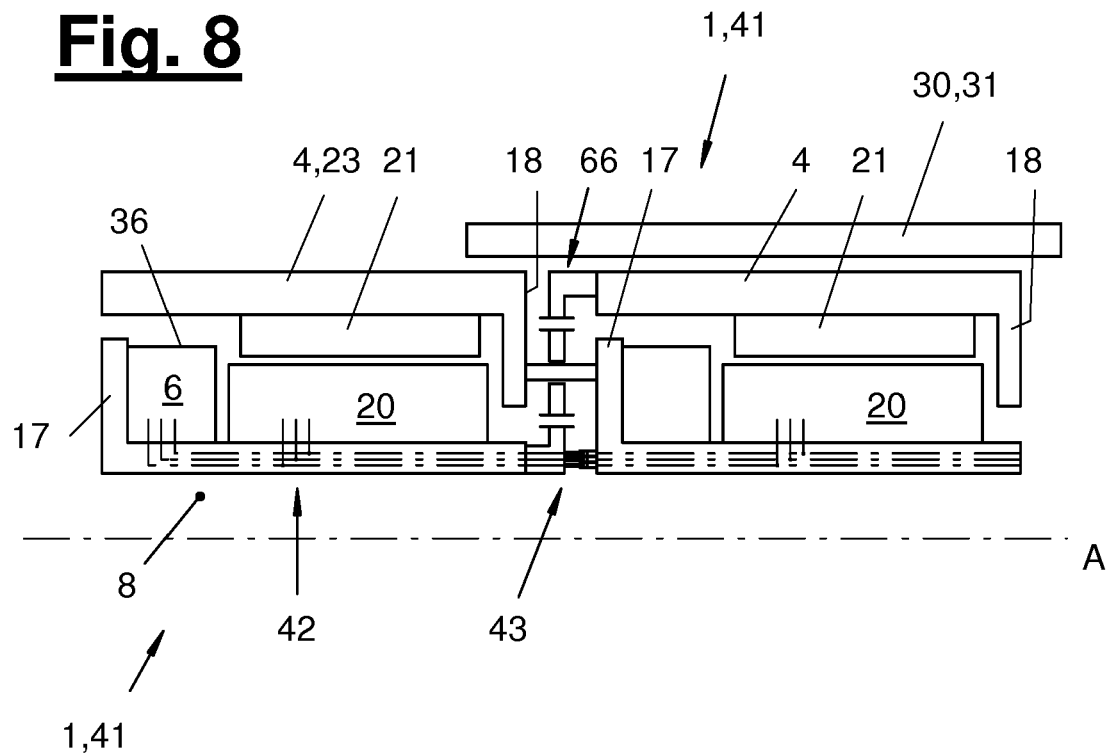

DRIVE TECHNOLOGY FOR VEHICLE TREATMENT INSTALLATIONS, IN PARTICULAR WASHING INSTALLATIONS

CROSS REFERENCE TO RELATED APPLICATIONS

This application is a United States National Phase Application of International Application PCT/EP2019/064878, filed Jun. 6, 2019, and claims the benefit of priority under 35 U.S.C. § 119 of German Application 20 2018 103 154.6, filed Jun. 6, 2018, the entire contents of which are incorporated herein by reference.

TECHNICAL FIELD

The disclosure pertains to a drive technology for apparatus constituent parts and especially for treatment elements of vehicle treatment installations.

TECHNICAL BACKGROUND

Operating different apparatus constituent parts of a treatment installation with respective different electrical drive motors, wherein the drive motors are configured, as a rule, as DC motors or asynchronous motors and are adapted to the respective apparatus constituent parts to be driven, is known in practice. The prior art drive motors have, as a rule, an internal rotor, which acts as a power take-off element and is connected to the apparatus constituent part to be driven, i.e., the motors are internal rotor motors.

SUMMARY

The drive technologies known up to now do not have an optimal configuration. An object of the present invention is therefore to provide an improved drive technology, especially an improved washing installation drive, a washing installation drive motor for use in a washing installation drive, a treatment installation or washing installation with a corresponding washing installation drive motor or washing installation drive as well as a treatment element and a vehicle treatment installation with a corresponding washing installation drive motor or washing installation drive.

The drive technology being disclosed comprises a modular concept, in which a plurality of drive motors have a uniform construction form (configuration and/or structural shape/design), so that they can be used to drive different apparatus constituent parts of the treatment installation. In addition, a drive motor with a hollow shaft is proposed. The area of use of the drive motor is massively increased by the use of a hollow shaft. A media supply is created by the hollow shaft for downstream apparatus constituent parts or for additional drive motors.

The drive technology makes provisions for the preferred use of a synchronous motor, especially in the form of an external rotor motor. A synchronous motor can cover especially many forms of drive for the different apparatus constituent parts. On the one hand, it can be controlled or regulated to a defined speed or to a defined torque. Moreover, control or regulation of the rotary position is possible. The synchronous motor can thus be used for both purely driving purposes as well as for force- or torque-regulated feed as well as for positioning tasks. A synchronous motor is thus also suitable for the joint driving of an apparatus constituent part with a plurality of drive motors.

The drive technology and/or the modular concept can provide for a plurality of washing installation drive motors or washing installation drives to be able to be connected to an installation control via uniform interfaces, wherein the installation control is configured for the automatic detection and/or configuration of a connected drive or of the power supply thereof. No specially trained skilled workers are thus necessary for a replacement or for a reconfiguration of a drive motor any longer. A plug-and-play concept is rather achieved.

The drive technology being disclosed thus makes it possible to achieve a far-reaching reduction of the component costs and facilitates the maintenance and the repair of drive motors. Further, a reduction of the power consumption and novel control concepts for the apparatus constituent parts can be achieved.

The present disclosure contains different aspects that contribute to the accomplishment of the object each individually or in a combination. These aspects may be used in themselves or in any combinations, namely, in a washing installation drive motor according to the present disclosure, in a washing installation drive according to the present disclosure, in a treatment element according to the present disclosure and/or in a vehicle treatment installation according to the present disclosure.

To make the description simpler and shorter, the term treatment installation will be used below for "vehicle treatment installation". The term "vehicle treatment installation" comprises all common washing installations, polishing installations or other installations, which are intended for a partially or fully automatic surface treatment of a vehicle. The vehicle to be treated may be, for example, a passenger car, a truck, a bus or a train. The treatment installation may be a portal installation, a treatment line or an intermediate form.

The term "apparatus constituent parts" comprises the terms "treatment element, moving device and feeding device." Moreover, additional constituent parts of a vehicle treatment installation may be considered to be drivable apparatus constituent parts in the sense of the present disclosure, for example, a traveling mechanism of a portal or of an entraining device of the treatment installation.

The term "treatment element" comprises different configurations of treatment brushes, especially washing brushes for cleaning the outer surfaces of a vehicle, polishing brushes as well as a drying device. In addition, other devices may fall within the scope of the term treatment element, especially those apparatus constituent parts that can be driven by a rotating drive and bring about a surface treatment of a vehicle.

A washing installation drive motor according to the present disclosure is a drive motor that is intended and configured for use in a washing installation or vehicle treatment installation. Special chemical conditions, which make it difficult to use conventional motors, prevail in vehicle treatment installations. For example, increased humidity or direct contact with liquid or even temporary submersion of a drive motor may be expected. On the other hand, alkaline or acid media may come repeatedly into contact with the motor.

The washing installation drive motor may have, for example, a housing, which is manufactured from materials that have a resistance to detergent solutions. It may, furthermore, be secured against the entry of liquid or moisture. Furthermore, the washing installation drive motor may have corrosion-resistant contacts and/or seals for the contacts and for the connection lines that may possibly be inserted from the outside.

A washing installation drive according to the present disclosure comprises a washing installation drive motor and a controllable power supply.

According to one aspect of the present disclosure, the washing installation drive motor is configured as a synchronous motor, especially as a brushless DC motor.

According to another aspect, the washing installation drive motor has an internal rotor/internal stator with a hollow shaft.

According to a third aspect of the present disclosure, the washing installation drive motor is configured as a modular drive unit, which is configured, given a uniform construction form, to drive different apparatus constituent parts of a treatment installation, especially washing installation. The washing installation drive motor may comprise an integrated controllable power supply, which may also bring about a control or regulation of the output, of the speed of rotation and/or of the rotary position. A washing installation drive may thus also form, as a whole, a modular drive unit, which, given a uniform construction form, is configured to drive different apparatus constituent parts of a treatment installation.

The configuration of a washing installation drive motor as a synchronous motor, especially as a brushless DC motor, offers various advantages. A considerable amount of energy can be saved compared to drives used up to now. This is true especially in case of the use of a washing installation drive motor or of a washing installation drive according to the present disclosure as a rotating drive for a treatment brush or for a traveling mechanism compared to the DC motors or asynchronous motors usually used as rotating drive or as a traveling mechanism. The washing installation drive motor or washing installation drive being proposed is thus more efficient and more environmentally compatible than prior-art drives.

The synchronous motor preferably has a motor winding for generating a magnetic field at one of the rotors and permanent magnets at the other rotor. The motor winding may have a plurality of partial windings, which can be energized especially via three phase wires. The permanent magnets are preferably configured as neodymium magnets. An especially high torque and an especially high power drain can be achieved hereby with a slim construction form. A reduction of the overall size and especially of the external diameter can be achieved compared to prior-art washing installation drives for the rotating drive of the treatment brushes at an essentially identical power drain, which makes it possible, in particular, to integrate the washing installation drive motor into a carrier tube or brush tube. An especially space-saving arrangement, in which the washing installation drive motor is, furthermore, protected especially well against environmental effects, is thus made possible.

The washing installation drive motor may also comprise a carrier tube or brush tube. In other words, the washing installation drive motor and the carrier tube or brush tube may be integrated with one another.

The washing installation drive motor is preferably configured and intended for an apparatus constituent part, which is to be driven, to be connected to an external rotor of the washing installation drive motor. The external rotor thus forms the power take-off element. In other words, the washing installation drive motor is an external rotor motor. The washing installation drive motor is preferably configured to drive the external rotor during the operation, so that the latter is moved in relation to an internal rotor/internal stator that is not being moved or is being moved relatively more slowly. In other words, the external rotor of the washing installation drive motor is provided, on the other hand, as a power take-off flange, which is provided and can be used as a power take-off flange.

The internal rotor of the washing installation drive motor may be arranged at the vehicle treatment installation such that it rotates in unison. The internal rotor forms in this case an internal stator. As will be described below, the internal rotor may also be fastened at a rotatingly moved apparatus constituent part of the vehicle treatment installation, so that the internal rotor rotates itself. The external rotor is set into a different rotary movement relative to the internal rotor.

The external rotor can preferably be connected (via a flange area or power take-off flange) to a carrier tube or to a brush tube or to another mounting area of the apparatus constituent part to be driven. The external rotor of the washing installation drive motor especially preferably has a brush mount, which is intended and configured for being connected to an apparatus constituent part of a washing or polishing brush such that they rotate in unison.

The external rotor may form a housing of the washing installation drive motor or be connected to a housing of the drive motor. The housing may comprise the flange area or the power take-off flange. The housing preferably encloses the electromagnetic and/or magnetic power components of the washing installation drive motor, especially a motor winding and permanent magnets. It preferably has an essentially cylindrical shape or a tubular shape. The housing may have a one-part or multipart configuration. It preferably extends over the entire axial length of the washing installation drive motor or over the majority of the axial length. Provisions may be made, in particular, for a part of the internal rotor, especially a flange area permanently connected to the internal rotor, to project over the housing at one end only. Only a flange area of the external rotor may be provided or a flange area of the external rotor and of the internal rotor, which are arranged adjacent to one another in the radial direction, may be provided at the other end. The flange area or flange areas of the internal rotor is/are preferably configured and provided as bearing flanges.

The term "drive motor" will be used in the following disclosure for simplicity's sake. This term covers a washing installation drive motor having the features according to at least one of the disclosed aspects as well as a drive motor of a different type. The respective configuration with a washing installation drive motor according to at least one of the aspects mentioned is preferred.

According to another aspect of the present disclosure, a vehicle treatment installation is provided, which has at least one rotatingly driven apparatus constituent part, which is driven via a drive motor, whose internal rotor has a hollow shaft.

A drive motor with an internal rotor, which has a hollow shaft, offers special advantages for the additional media supply or control of an apparatus constituent part of the treatment installation, which apparatus constituent part is connected to the drive motor. For example, electrical lines, flexible hoses and/or mechanical control devices can be passed through the cavity of the hollow shaft. The hollow shaft thus forms a passage or cavity passage open to the axial ends. The cavity passage may be a passage or a media passage. Different, especially advantageous uses of the cavity passage will be explained below.

The internal rotor may preferably be mounted stationarily or only displaceably at the end pointing towards the treatment installation (dorsal end), so that the hollow shaft of the drive motor is not subject to any movements or only to slight movements (internal rotor=internal stator). Additional components may be able to be fixed at the end of the internal rotor, which end points towards the apparatus constituent part to be driven (distal end), and these additional components may thus likewise be able to be mounted stationarily or only displaceably. In other words, the internal rotor may be used as a mounting support for components of the apparatus constituent part to be driven.

The drive motor or the washing installation drive according to the present disclosure also makes it possible to configure treatment brushes with separately drivable brush segments, which may adjoin each other especially directly or at an only short distance (less than, for example, 5 cm).

A treatment brush according to another aspect of the present disclosure has a plurality of separately driven brush segments, wherein a separate drive motor, especially a washing installation drive motor according to the present disclosure, is provided for each brush segment. At least one drive motor is preferably integrated into a brush segment, especially into the brush tube of a brush segment. Furthermore, the treatment brush may preferably be configured as a bent brush.

A first brush segment of an essentially cylindrical washing brush may especially preferably be arranged at an external rotor of a first drive motor. A second drive motor, which drives a second brush segment of the essentially cylindrical washing brush, may be mounted directly or indirectly at the distal end of this drive motor. The two or more brush segments can preferably be driven each in a separately controlled manner. This arrangement may be repeated several times. For example, a center-pivot hinge may be provided between two drive motors, which drive a respective different brush segment, in order to change the slope of the brush segments about one or more axes in relation to one another, especially in order to adapt a slope of the respective brush segment in relation to the vertical direction.

One aspect of the present disclosure makes provisions for the drive motor, especially the washing installation drive motor in accordance with the above-mentioned aspects, to be configured as a modular drive unit with a standardized or uniform construction form. This drive motor may be used in the same manner for many different apparatus constituent parts.

The configuration of the drive motor or of a washing installation drive as a whole as a modular drive unit with a uniform construction form has the advantage that the number of identical parts can be markedly increased and the manufacturing costs can thus be reduced. Further, the number of spare parts for a treatment installation can be reduced. As a consequence of the uniform construction form, a drive motor or a washing installation drive may be used for different apparatus constituent parts. It may thus be sufficient to stock only one drive motor or washing installation drive or a few drive motors or washing installation drives as spare parts. The replacement of a defective drive motor or of a defective washing installation drive can be carried out especially rapidly and simply as a consequence of the uniform construction form, because no special knowledge is necessary concerning the apparatus constituent parts or treatment elements. Different features that can ensure the uniform construction form individually or in combination will be explained below.

A treatment installation according to another aspect of the present disclosure comprises one or more driven treatment elements for the surface treatment of at least one vehicle, especially of a passenger car or of a truck. Two or more drive motors with a standardized or uniform construction form, especially a washing installation drive motor according to one of the above aspects, are provided as the drive for at least two apparatus constituent parts of different types, especially for two treatment elements of different types.

The treatment installation may have any desired configuration within the framework of the present disclosure. It may have, in particular, a portal, at which the one or more treatment elements are arranged, wherein the portal is moved for a treatment process in relation to a stationary vehicle. As an alternative, the treatment installation may be a treatment line, in which the one or more treatment elements are arranged statically or at any desired moving devices, wherein one or more vehicles are moved through the washing line and are fed to the one or more treatment elements. The conveying device may be, in particular, an entraining device, preferably a chain with carriers, which can be fastened to a vehicle wheel.

It will be assumed below for simplicity's sake that the treatment installation is a portal type washing installation.

The treatment installation according to the present disclosure preferably has at least one drive, which is formed by a washing installation drive according to the present disclosure. As an alternative or in addition, the treatment installation has modular drive units for driving different apparatus constituent parts of the treatment installation, wherein the modular drive units have a uniform construction form.

A treatment element according to the present disclosure is intended and configured for use at or in a vehicle treatment installation. The treatment element may be, in particular, a side washing brush, a roof brush, a wheel washing brush or a drying device (for example, a blower). The treatment element has a rotatable range of action, which is rotatable in relation to a basic body of the treatment installation, especially in relation to a portal of the treatment installation. The range of action is connected to a carrier tube of the treatment element, rotating in unison. The range of action may comprise, for example, a brush trim, one or more blower blades, or other acting devices suitable for the surface treatment of vehicles. A drive motor and/or a controllable power supply, especially a washing installation drive or a washing installation drive motor according to the present disclosure, are arranged in the carrier tube or in the brush tube.

An especially preferred embodiment of a treatment element according to the present disclosure is a treatment brush, especially a side washing brush, with a plurality of brush segments. The treatment brush is preferably fastened at a dorsal end at the treatment installation. The fastening may be carried out via a drive motor according to the present disclosure. The treatment brush has two or more separately drivable brush segments. A first brush segment is arranged at the dorsal end, i.e., on the side of the treatment brush that points towards the fastening point at the treatment installation. One or more additional brush segments, which can be called distal brush segments, follow in the axial direction. At least one distal brush segment is preferably driven by a (separate) drive motor according to the present disclosure, which may be arranged especially in the brush tube of this distal brush segment. A center-pivot hinge may be provided between two brush segments of the treatment brush.

The internal rotor of a drive motor, which drives a distal brush segment, is preferably mounted directly or indirectly at the internal rotor of a drive motor, which drives a dorsal brush segment or an upstream distal brush segment. A media supply and/or a mechanical control device can be passed through the hollow shaft(s) of the drive motor, which drives the dorsal brush segment or an upstream distal brush segment. The mechanical control device may be used to actuate a center-pivot hinge. The media supply may be used to supply a distal brush segment or a distal drive motor, for example, with a washing fluid (liquid and/or gas) or with electrical signal or load currents.

The disclosure also comprises an operating process for a vehicle treatment installation, which has a plurality of driven apparatus constituent parts, which are operated each via a drive motor. At least two of these drive motors, which drive different apparatus constituent parts, have a uniform construction form. They may be especially washing installation drive motors or washing installation drives according to the above aspects. The operating process comprises a vehicle treatment process, especially a washing process. The operating process comprises, as an alternative or in addition, steps for detecting and/or setting up at least one washing installation motor and/or a washing installation drive.

The present invention is shown schematically as an example in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 7 through 8 are schematic views showing examples of drive motors in a cascade arrangement.

DESCRIPTION OF PREFERRED EMBODIMENTS

Figure 1:
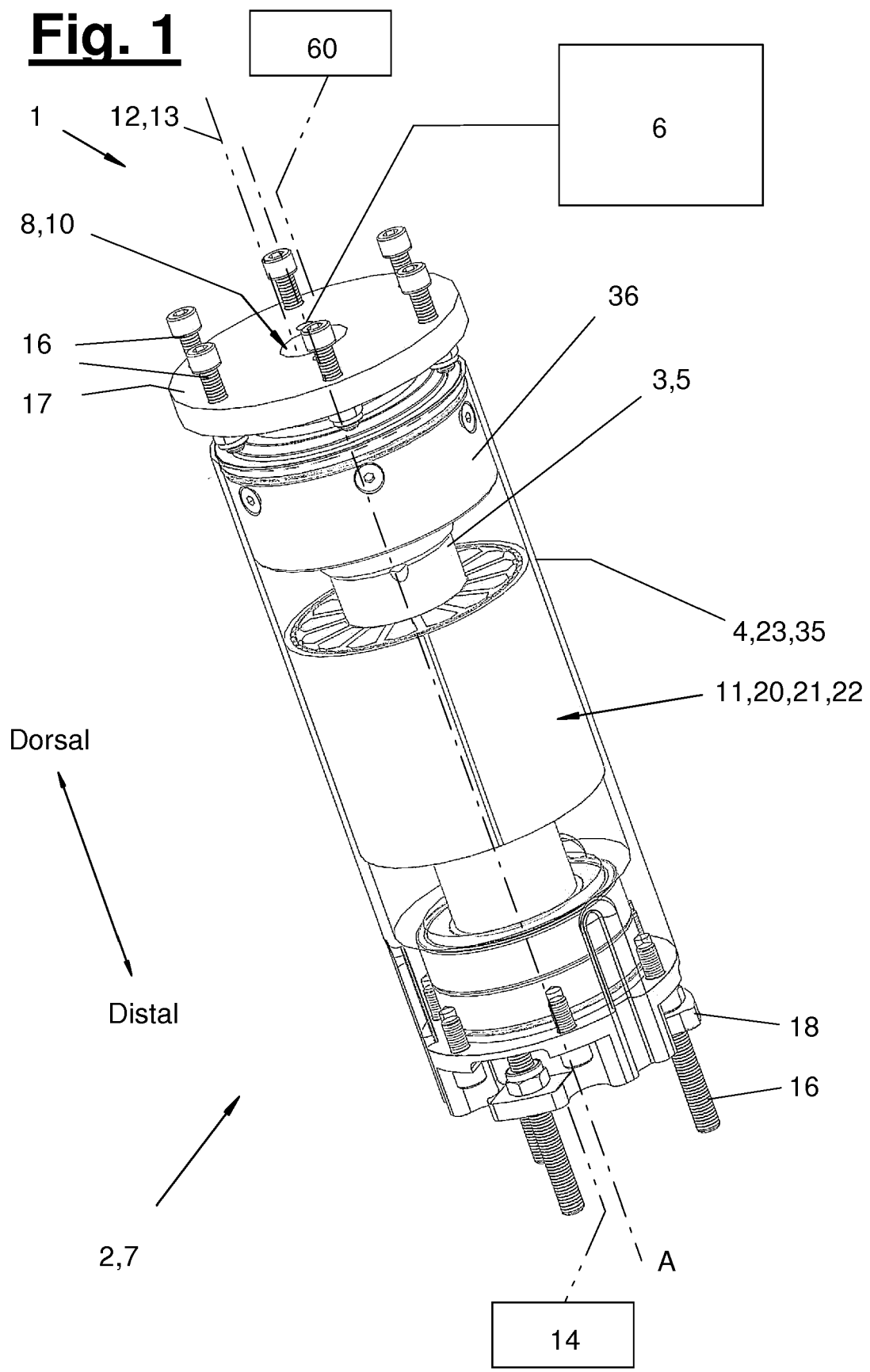
FIG. 1 is a perspective view showing a drive motor according to the present disclosure in an oblique view.

Referring to the drawings, a preferred embodiment of the drive motor (2) according to the present disclosure is shown in FIG. 1. The drive motor (2) may be present in itself or, combined with a controllable power supply (6), it may be part of a washing installation drive (1).

FIGS. 2 through 6 show preferred embodiments of a treatment installation (60) for vehicles and treatment elements (50) thereof and drivable apparatus constituent parts (14). The treatment elements include, for example, an essentially cylindrical side washing brush (51, 52) with one or more brush segments (53, 54), an essentially cylindrical roof brush (55), an essentially disk-shaped wheel washing brush (56) and a drying device (57). The other drivable apparatus constituent parts (14) include, for example, a traveling mechanism (68), a moving device and one or more feeding devices.

The drive motor (2) is configured as a synchronous motor, especially as a brushless DC motor, and it is shown in preferred embodiments in the drawings. It has an external rotor (4) and an internal rotor (3). The external rotor (4) preferably forms the power take-off element of the drive motor (2). The internal rotor (3) preferably has a hollow shaft (5), whose cavity (8) preferably extends in the axial direction (A) of the drive motor (2) over the entire length of the drive motor (2). The internal rotor preferably forms the mounting element of the drive motor (2). The cavity (8) preferably has openings (9, 10) towards both ends. These may be especially a front opening and a rear opening (9, 10), respectively, in the axial direction (A) of the drive motor (2). The openings are preferably freely accessible. The cavity in the hollow shaft between the openings is preferably freely continuous. The wall of the hollow shaft, which defines the cavity located on the inside, is preferably closed. In other words, there is preferably no passage from the cavity of the hollow shaft in the axial direction to the outside.

The part of the drive motor (2) that is intended for fastening at the treatment installation (60) is called the dorsal part. The dorsal side of the drive motor (2) is correspondingly the side on which the drive motor (2) is to be fixed mechanically during use as intended. The part of the drive motor (2), which points towards the apparatus constituent part (14) of the treatment installation (60), which apparatus constituent part is to be driven, is correspondingly called the distal part.

The drive motor (2) preferably has one or more flange areas (17, 18, 19), via which the drive motor (2) can be connected, for example, to a basic body or to a frame of a treatment installation (60) and, on the other hand, to an apparatus constituent part (14) to be driven, especially to a treatment element (50). A direct or indirect mechanical connection to at least one additional drive motor (2) may also be provided or established in a cascade (41) or in a multiple arrangement at one of the distal flange areas (18, 19). The flange area or flange areas (17, 18, 19) may, individually or in a combination, be a part of a uniform construction form of a plurality of modular drive units (7).

The internal rotor (3) of the drive motor (2) preferably has, especially at least at an axial end, a flange area (17), especially at least at the dorsal axial end. The internal rotor (3) may especially preferably have at both axial ends a respective flange area (17, 18) each, which are arranged rigidly in relation to one another. As an alternative or in addition, the external rotor (4) of the drive motor (2) has a flange area (18) at an axial end, especially at the distal axial end. The flange areas of the internal rotor (3) and of the external rotor (4), which flange areas may possibly be present at the distal axial end, are preferably arranged next to one another and adjacent to one another in the radial direction. This is shown, for example, in FIGS. 7 and 8, which show the drive motor (2) in a sectional view and in cascade arrangements (only the upper half is shown).

A drive motor (2) is preferably connected at the dorsal end to a basic body or frame of the treatment installation (60) such that they rotate in unison. A flange area (17) that is connected to the internal rotor (3) is especially preferably provided at the dorsal axial end (exclusively). In other words, an internal rotor of the drive motor (2) is connected to a stationary or optionally displaceable connection area of the treatment installation (60) such that they rotate in unison.

The distal axial end of the drive motor (2) is preferably connected to an apparatus constituent part of the treatment installation (60), which apparatus constituent part is to be driven rotatingly. The connection may be effected especially via a flange area (18), which is connected to the external rotor (4) at the distal axial end. The flange areas (17, 18, 19) may have each any desired configuration, especially as a ring flange or as a flange plate. The other possibility, namely, the possibility of connecting the flange areas (17, 18, 19) of adjacent drive motors (2) to one another, will be discussed below with reference to FIGS. 7 and 8.

The external rotor (4) may be mounted rotatably in relation to the internal rotor (3) in any desired manner. Rolling bearings (not shown) are preferably provided in the axial direction (A) in front of and behind the motor winding. A gap between the dorsal mounting flange (17) of the internal rotor (3) and the external rotor (4) may be closed by a sealant. Further, a sealant may be provided at the distal end between the external rotor (4) and the internal rotor (3), especially between the mounting flanges (18, 19) of the internal rotor and of the external rotor, which flanges are arranged there.

Exemplary fastening devices (16) in the form of screws, by which the internal rotor (3) and/or the external rotor (4) can be connected at the respective flange area (17, 18) to an adjoining component, are provided in the figures at the flange areas (17, 18). As an alternative, any other fastening devices (16) may be provided. The fastening means (16) may be oriented essentially in the axial direction (A) of the drive motor (2) according to the view shown in the figures. As an alternative or in addition, one or more fastening devices can connect in the radial direction an adjoining component to the internal rotor (3) or to the external rotor (4). It is possible, in particular, to arrange a carrier tube (30), a brush tube (31), a drive roller or another element of an apparatus constituent part (14), which element is to be driven, on a cylindrical outer circumference (23) of the drive motor (2) and to fix it such that they will rotate in unison.

The drive motor (2) has a motor winding (20), which may comprise two or more partial windings (not shown). The motor winding (20) is preferably connected to the internal rotor (3) and is arranged especially in a space between the hollow shaft (3) and the external rotor (4). The drive motor (2) has, furthermore, a plurality of permanent magnets (21), which are especially preferably connected to the external rotor (4) (cf. view in FIGS. 1, 7 and 8).

According to the above-mentioned preferred fixation of the internal rotor (3) at a stationary or only displaceable component of the treatment installation (60), the internal rotor (3) preferably forms a stationary element, in relation to which the external rotor (4) is set into a rotary movement. If the internal rotor (3) is also subject to a rotary movement, the external rotor (4) rotates, as a rule, at a relatively higher speed of rotation (cf. following explanations in connection with FIGS. 7 and 8).

The arrangement of the permanent magnets (21) at the external rotor (4) rotating at a higher speed relative to the internal rotor has the advantage that the centripetal force, which holds the permanent magnets (21) in the desired position, can be applied by an essentially cylindrical housing (35) or a cylindrical wall of the external rotor (4), namely, as a pure force of reaction to a centrifugal force, which is caused by the rotary movement and which forces the permanent magnets (21) to the outside. When arranged at the external rotor rotating at a higher speed relative to the internal rotor, the permanent magnets can consequently be held reliably in the predefined position even at very high speeds of rotation and the risk of a rupture of the magnet or of separation of the magnet due to the centrifugal force is markedly reduced or ruled out.

The washing installation drive (1) preferably has a rotary position detection device (11) for the drive motor (2). The rotary position detection device (11) may have any desired configuration and may be arranged as desired. According to a first preferred embodiment, at least one Hall sensor (22) is arranged at or in the drive motor (2). The at least one Hall sensor (22) is preferably configured to detect a current magnetic field in the drive motor (2). A current rotary position of the drive motor (2) can be detected from the position of the magnetic field at least as a current relative angle of rotation between a reference point at the internal rotor and a reference point at the external rotor. The rotary position detection device (11) can thus be a (direct) rotary field detection or a (direct) magnetic field detection.

As an alternative or in addition, a detection device may be provided, which determines a rotary position (D) of the drive motor (2) on the basis of a comparison of the current supply currents that are fed to the motor winding (20) or to the partial windings thereof. In particular, a vector comparison between the current motor currents of the partial windings may be carried out. An (indirect) detection of the rotary field and of the magnetic field can also be carried out with this vector comparison. Thus, the performance of a vector comparison between the motor currents also represents an (indirect) rotary field detection or a magnetic field detection.

The washing installation drive (1) is preferably configured to preset and especially to regulate a current rotary position (D) of the drive motor (2). In other words, a rotary position of the drive motor (2) can preferably be preset and possibly regulated in the manner of a stepping motor. This is advantageous, for example, when the drive motor (2) or the washing installation drive (1) is used to drive a traveling mechanism (68) or a drive roller (34) of the treatment installation (60) (cf. FIG. 5) or to drive a feeding device (65) or a moving device (64) (cf. FIG. 2).

The hollow shaft (5) of the drive motor (2) can advantageously be used for different purposes. According to a first preferred embodiment, a media supply (12) may be able to be arranged or may be arranged in the hollow shaft (5) of the drive motor (2). The media supply (12) can supply especially a treatment element (50), which can be driven or is driven by the drive motor (2).

Figure 4:
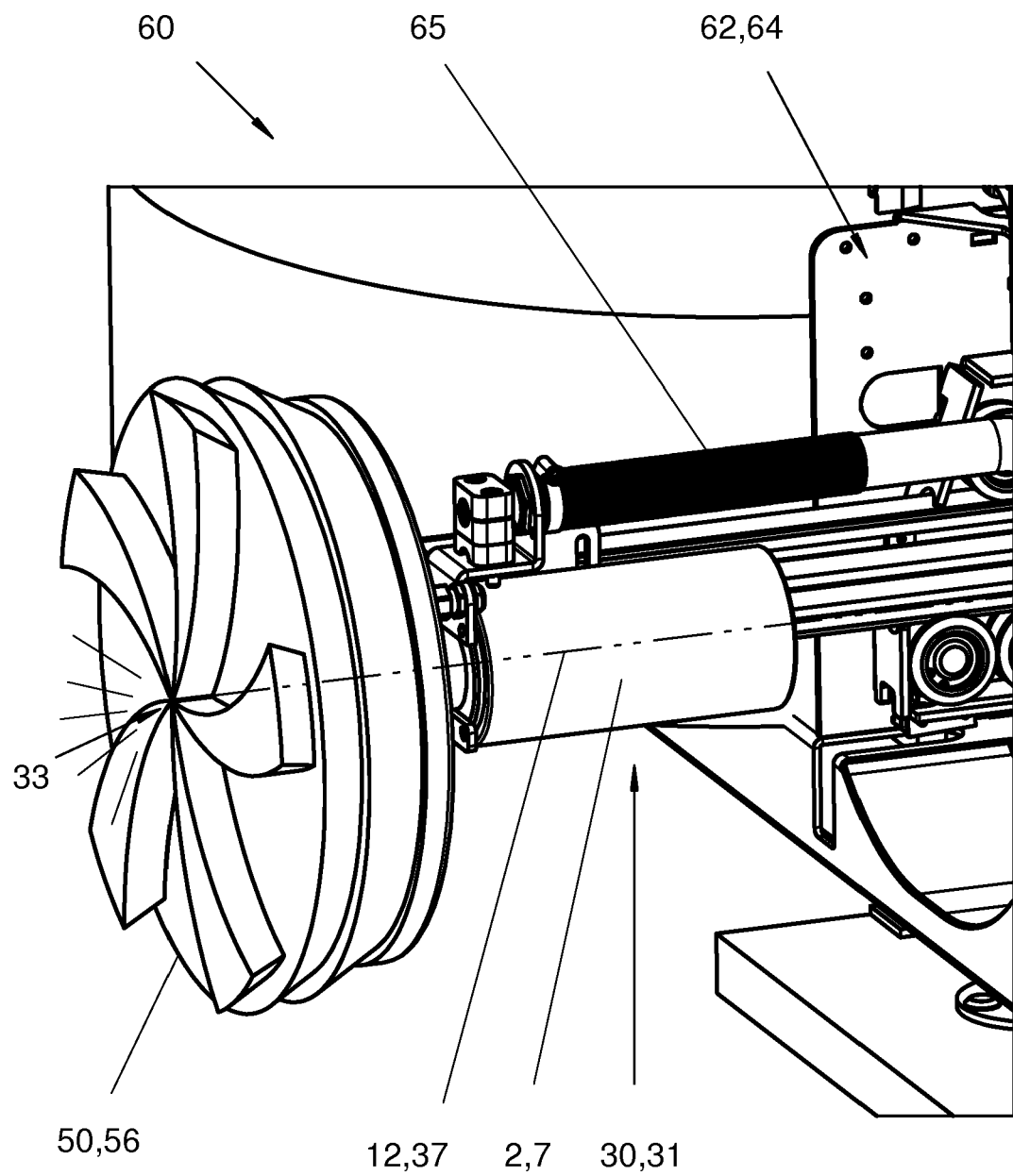

In the example according to FIG. 4, the media supply (12) comprises, for example, a washing liquid passage (37), through which one or more washing liquids can be fed to a driven treatment brush (50, 56). In the example according to FIG. 4, a wheel washing brush (56) is supplied with a washing liquid, which comprises, for example, water, at least one detergent additive and optionally a foaming agent, The washing liquid passage (37) may be defined directly by the hollow shaft (5). As an alternative or in addition, a washing liquid passage (37) or another fluid passage passed through the hollow shaft (5) may be defined by an additional guiding device, for example, a flexible hose or a pipe.

A media supply (12) may also comprise a gas passage, especially a compressed air passage. The media supply (12) may comprise, furthermore, one or more guiding devices, which send load or signal currents to a drive motor (2) located downstream in the distal direction or to other apparatus constituent parts (14) that can be operated or controlled electrically.

As an alternative or in addition, a mechanical control device (13) may be able to be arranged or may be arranged in the hollow shaft (5) of the drive motor (2). The mechanical control device (13 may have any desired configuration. It may be configured, in particular, to preset or to influence a position or pose of an apparatus constituent part (14) of the treatment installation (60), which apparatus constituent part is moved by the drive motor (2), and in the hollow shaft (5) of which the mechanical control device (13) is arranged.

Figure 2:
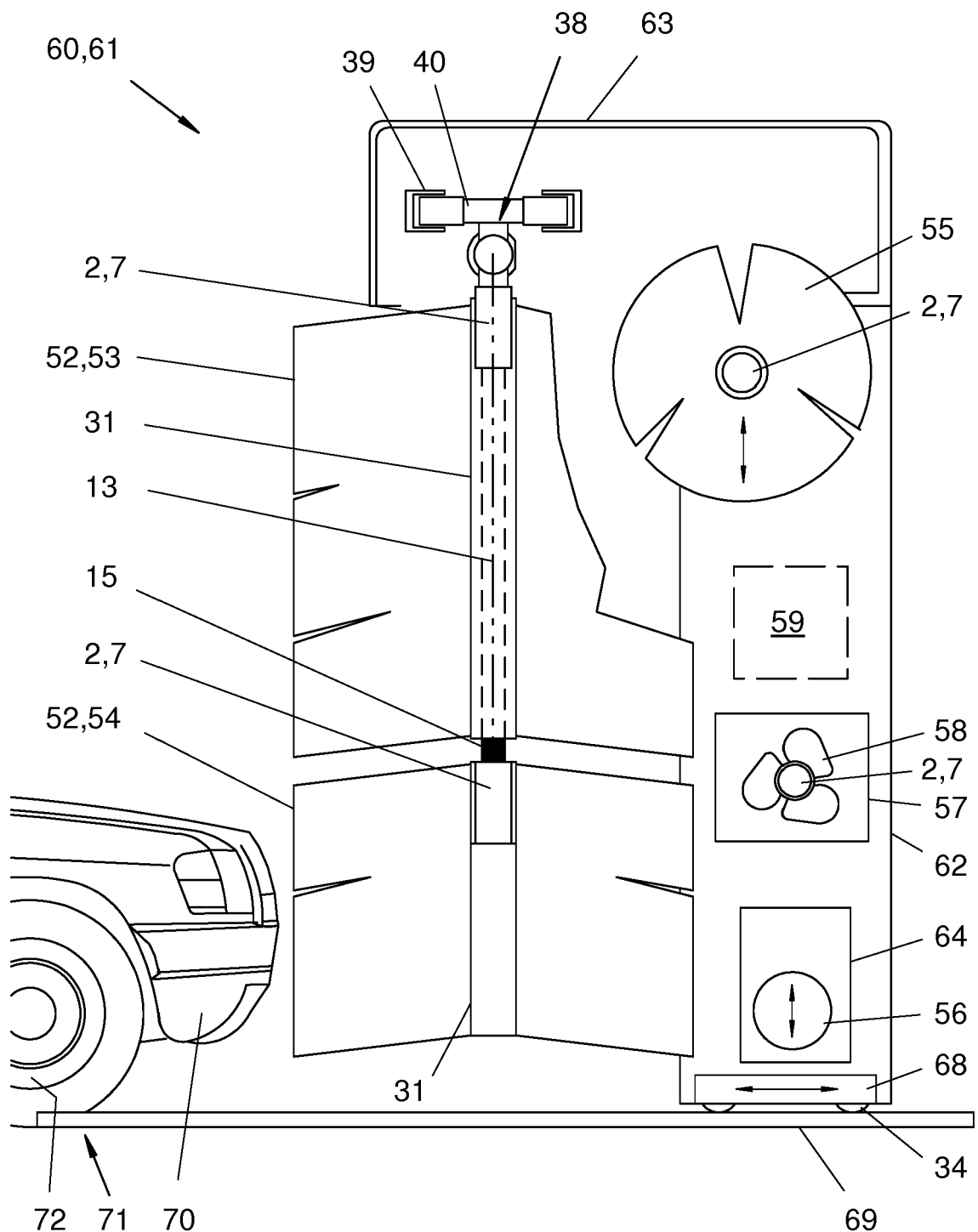
FIG. 2 is a side view showing a treatment installation according to the present disclosure in a schematic side view.

In the example according to FIG. 2, the mechanical control device (13) is a push rod, which is passed through the hollow shaft (5) of a dorsal drive motor (2). The push rod is movable in the axial direction (A). It can be moved by a bent drive (38), which is arranged at the dorsal end of the side washing brush (52). The push rod may extend from the bent drive (38) through the hollow shaft (5) and optionally farther through a brush tube (31) of the side washing brush (52) or of a dorsal brush segment (53) to a center-pivot hinge (15). By actuating the mechanical control device, especially by a movement of the push rod, the center-pivot hinge (15) can be actuated in order to move a part of the side washing brush (52), especially a lower or distal brush segment (54), in relation to an upper or dorsal brush segment (53). The movement may be especially a bending or pivoting movement.

The mechanical control device (13) may be present as one device or as a plurality of devices. According to a preferred embodiment variant, a first mechanical control device is formed by a push rod, whose displacement brings about a pivoting movement of a lower brush segment (54) about a first axis. A second mechanical control device (13) may be formed by another push rod, whose movement brings about a second pivoting movement of the lower brush segment (54) about a second pivot axis. The first pivot axis may be, for example, an axis directed in the longitudinal direction of the vehicle (70), while the second pivot axis may be a pivot axis oriented in the transverse direction of the vehicle (70).

According to another embodiment, a braking device or a blocking device (not shown) may be arranged in or at the hollow shaft (5) of the drive motor (2). Likewise, an actuator (not shown) may be arranged, as an alternative or in addition, in or at the hollow shaft (5) of a drive motor (2).

The actuator may have any desired configuration. It may be able to be operated or actuated directly or indirectly especially by the magnetic field of the drive motor (2). The actuator may be, according to an optional configuration, an actuator for the aforementioned braking device or blocking device or an actuator for another braking device or blocking device. The actuator and/or the braking device or blocking device may each bring about, individually or jointly, a braking or blocking of the drive motor (2) or of an apparatus constituent part (14) to be driven, especially a braking or holding of the external rotor (4) relative to the internal rotor (3).

The braking device or blocking device may have a self-closing configuration. The braking effect or blocking effect may be weakened or abolished by the magnetic field of the drive motor (2). Such a configuration is especially advantageous for the use of the drive motor (2) for operating a moving device or of a feeding device. This pertains especially to a moving device or to a feeding device for a treatment element (50), which is moved against an impressed force or a prestressing force, i.e., for example, for feeding a roof brush (55), which is raised against its own weight, in order to remove it from the vehicle (70). When the feeding device provided for this purpose has a drive motor (2) with an aforementioned braking device or blocking device, an accidental lowering of the roof brush (55) can be prevented by the braking effect or blocking effect developing by itself when the drive motor (2) is de-energized.

In other words, the drive motor (2) may be configured as a self-blocking or self-braking drive motor. A braking or blocking device of the aforementioned type may also be arranged within the drive motor (2) between the internal rotor (3) and the external rotor (4). The braking or blocking device may, furthermore, be actuated by the supply currents, which are fed to the motor winding (20). The actuation may provide for the braking effect or blocking effect to be weakened or abolished by the supply currents.

The drive motor (2) may be integrated in different ways in a mounting area of an apparatus constituent part (14) of the treatment installation (60), which apparatus constituent part is to be driven. It is especially advantageous for this purpose if a plurality of drive motors (2) are configured as modular drive units (7) with a uniform construction form.

According to a first variant, the drive motor (2) may be integrated in a carrier tube (30) of a treatment element (50). The carrier tube (30) may be especially a brush tube (31) of an essentially cylindrical treatment brush (51, 55). The drive motor (2) preferably has for this purpose an external rotor (4) with a cylindrical outer contour (23). The diameter of the cylindrical outer contour (23) is preferably smaller than or equal to the internal diameter of the carrier tube (30) or of the brush tube (31). In particular, a fitting may be provided between the cylindrical outer contour (23) and the internal diameter of the carrier tube or brush tube (30, 31) (cf. FIGS. 2 and 3).

As an alternative or in addition, a drive motor (2) may be able to be integrated or may be integrated in a flanged tube (32) of an essentially disk-shaped treatment brush (56). The cylindrical outer contour (23) may have for this purpose a corresponding fitting in relation to the flanged tube (32 (cf. FIG. 4).

As an alternative or in addition, the drive motor (2) may, in turn, be able to be integrated or may be integrated into a carrier tube (30) of a blower (58), the blower (58) preferably being a part of a drying device (57) of the treatment installation (60). A corresponding fitting may be provided for this purpose between the cylindrical outer contour (23) of the drive motor (2) and the carrier tube (30) of the blower (58).

Figure 5:
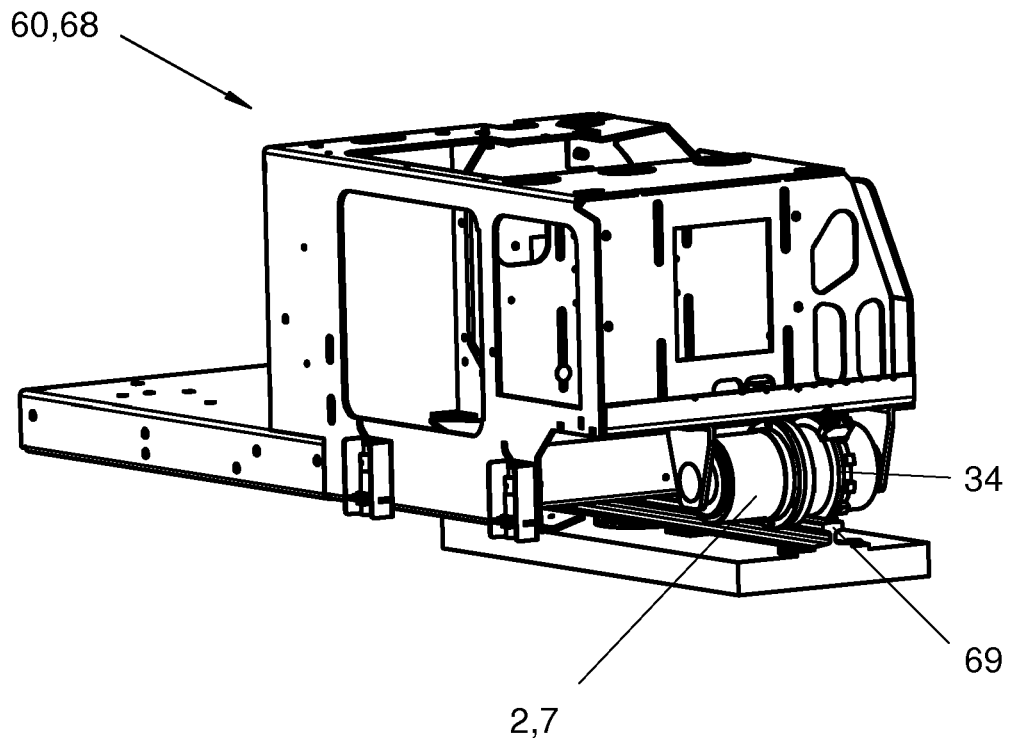
Figure 6:
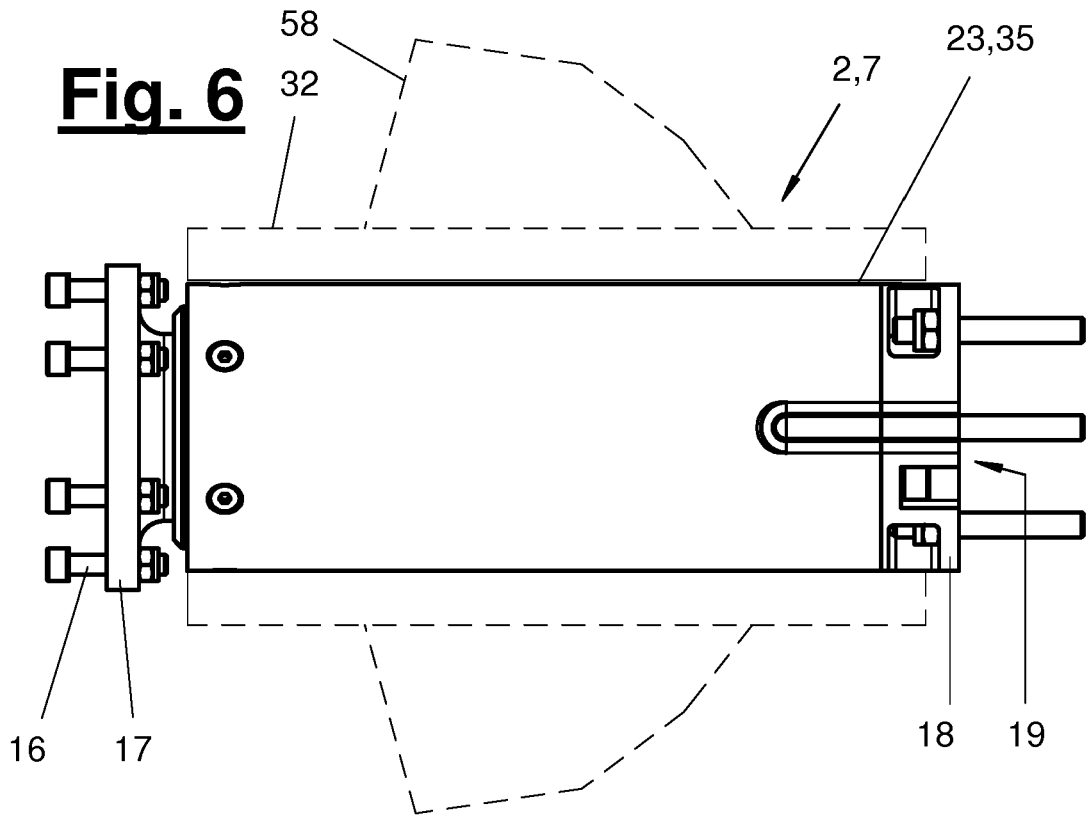

As an alternative or in addition, the drive motor (2) may, in turn, be able to be integrated or may be integrated into a drive roller (34) of a traveling mechanism (68) of a treatment installation (60), for which purpose a corresponding fitting is likewise provided between the cylindrical outer contour (23) and, for example, a drive roller (34) of the traveling mechanism (68), which said drive roller (34) is to be driven (cf. FIG. 5).

According to the uniform construction form, identical external diameters of the cylindrical outer contour (23) and correspondingly identical or similar internal diameters of the receiving carrier tube (30), brush tube (31), flanged tube (32) and/or of the drive roller (34) may be provided for the integration of the drive motor in the above-mentioned variants.

The power supply for supplying at least one drive motor (2) according to the present disclosure may have any desired configuration. It preferably supplies the motor winding (20) of at least one drive motor (2) with the needed supply currents in order to set the at least one drive motor (2) into a rotary motion.

The power supply (6) is preferably connected to a rotary position detection device (11) of at least one drive motor (22). The supply currents may be generated as a function of the rotary position detection device (11).

According to a preferred embodiment variant, the power supply (6) comprises a terminal for connecting one, two or three Hall sensors (22), which are arranged at or in the at least one drive motor (2).

The controllable power supply (6) is preferably configured to regulate the speed of rotation of the drive motor (2) as a function of a speed specification and/or a rotary position detection and especially of a Hall measurement (22). As an alternative, a control or regulation of the speed of rotation may be carried out in another manner.

The controllable power supply (6) is configured, as an alternative or in addition, to regulate a rotary position of the drive motor, especially a relative rotary position of the external rotor (4) and of the internal rotor (3), as a function of an angle of rotation specification, especially of a Hall measurement (22). As an alternative, a control or regulation of the current rotary position of the drive motor (2) may be carried out in another manner.

The controllable power supply (6) is especially preferably configured to control the drive motor (2) by direct control of the torque or of the supply currents, doing so as a function of a rotary position detection device (11), which determines a rotary position of the drive motor (2) on the basis of a vector comparison of the current supply current of the drive motor (2). In other words, the controllable power supply (6) is configured to carry out a direct torque control on the basis of a vector analysis of the supply currents. This regulation may, in particular, be independent from a Hall measurement (22).

FIG. 2 shows a treatment installation (60) according to the present disclosure in an embodiment as a washing installation, especially as a portal washing installation.

The treatment installation (60) comprises a displaceable portal (61), which is moved especially by means of a traveling mechanism (68). The traveling mechanism (68) comprises one or more drive rollers (34). The drive rollers (34) may have any desired configuration.

The traveling mechanism (68) is shown separately in FIG. 5. According to a preferred embodiment variant, the at least one drive roller (34) rolls on a running rail (69), which is arranged in the bottom area of the treatment installation (60). The drive roller (34) may preferably bring about an essentially slip-free movement of the portal (61), especially by meshing of teeth between the drive roller (34) and the running rail (69). The drive roller (34) is preferably driven by a drive motor (2) or a washing installation drive (1) according to the present disclosure. The drive motor (2) may be inserted or integrated into the drive roller (34), the drive roller (34) sitting on a cylindrical outer circumference (23) of the drive motor (2).

The treatment installation (60) preferably comprises at least one column, especially at least one movable portal column (62). One or more treatment elements (50) may be arranged at the column or portal column (62). The treatment element (50) or the plurality of treatment elements (50) may be moved individually or in combination by one or more moving devices or feeding devices.

A first treatment element (50) may be a wheel washer. This preferably comprises an essentially disk-shaped treatment brush (56), which will hereinafter be called a wheel washing brush.

FIG. 4 shows a preferred embodiment variant of the wheel washing device. The wheel washing brush (56) is driven accordingly by a drive motor (2) or by a washing installation drive (1) according to the present disclosure. In particular, the drive motor (2) can be integrated for this purpose into a carrier tube (30) or brush tube (31) of the wheel washing brush (56).

A washing liquid passage leading to the treatment brush (56) is preferably passed through the hollow shaft (5) of the drive motor (2). A washing liquid applicator (33), by which the washing liquid being fed is applied to the brush and/or to the vehicle wheel (71) to be cleaned during the treatment process, may be provided at the treatment brush (56).

The wheel washing device preferably comprises a feeding device (65), which is configured to feed the wheel washing brush (56) into a working position at the vehicle (70). The feeding device (65) may be present separately or be a part of a moving device (64). The moving device (64) may have any desired configuration. It may be configured as a monoaxial or multiaxial moving device.

According to a preferred embodiment variant, the moving device (64) makes it possible at least to raise the wheel washing brush (56) vertically. Moreover, it may make possible the aforementioned feeding movement.

The treatment installation (60) may be configured to move the wheel washing brush (56) by a combined actuation of the moving device (64) and of a traveling mechanism (68). The movement may be especially an arcing motion, by which the wheel washing brush is moved in an essentially vertical plane. In other words, the wheel washing brush is guided by combined actuation of the moving device and of the traveling mechanism by an essentially vertical arcing motion. An upwards or downwards pointing component of the arcing motion can be generated by the moving device (64) of the wheel washing brush. A horizontally directed component of the arcing motion may be generated by a traveling movement of the column (62) or by the actuation of the traveling mechanism (68).

The arcing motion may be selected as desired. It is preferably selected to be such that an external diameter of the wheel washing brush (56) is caused to be essentially tangential to an external diameter of a vehicle wheel (71) and especially of a rim (72).

For example, during a movement of the portal along the vehicle (70) in the forward direction, the washing brush (56) may be arranged at first at a medium level, e.g., at the level of the wheel axle. The wheel washing brush (56) may at first be raised during the moving past, brought about by the traveling mechanism (68), until it reaches the topmost area of the vehicle wheel (71), which area is to be washed. The wheel washing brush (56) can then again be lowered until it comes approximately to the axle level. During this moving along, especially the raising and lowering movement can be controlled according to a sine function and the travel movement of the portal can be controlled according to a cosine function, so that the vectorial superimposition of the raising movement and of the travel movement yield a semicircle.

During a travel of the portal in the opposite direction, i.e., in the reverse direction of the vehicle (70), the wheel washing brush (56) can correspondingly be lowered at first in the reverse manner starting from a medium level and then raised again in order to correspondingly wash the lower half of the wheel during an arcing motion.

As an alternative to the aforementioned example, the direction references may be transposed or changed in any desired manner in order to bring about other arcing motions.

The treatment installation according to FIG. 2 comprises, furthermore, a drying device (57), which may have any desired configuration. The drying device (57) preferably comprises at least one blower (58). The blower (58) is configured to generate an air stream, which can be directed by optional additional device-technological units towards the surface of the vehicle (70) to be treated. The blower (58) is shown in an exemplary embodiment variant in FIG. 6. It is driven by a drive motor (2) or by a washing installation drive (1) according to the present disclosure. The blower (58) comprises a flanged tube (32), in which the drive motor (2) and especially a modular drive unit (7) having the uniform construction form can be integrated.

The treatment installation (60) according to FIG. 2 comprises one or more essentially cylindrical treatment brushes, especially at least one roof brush (55) and at least one side washing brush (52). Each of these brushes can be moved by a suitable feeding device into a working position at the vehicle and also removed from the vehicle. The feeding of the roof brush (55) is carried out preferably by a raising or lowering movement. The feeding of a side brush (52) is preferably carried out by a closing or opening movement oriented in the transverse direction of the vehicle (70).

The feeding devices (not shown) of the roof brush (55) and of the side washing brushes (52) may be configured as desired. They may, in particular, be driven by a drive motor (2) or by a washing installation drive (1) according to the present disclosure, the drive motor (2) and/or the washing installation drive (1) being configured especially as a modular drive unit (7) with a uniform construction form.

The washing installation drive (1) and the power supply (6) are preferably configured to control or regulate the drive motor (2) to assume and maintain a defined rotary position. This assumption and maintenance of the rotary position can be achieved with or without a braking or blocking device of the above-described type. In particular, a defined rotary position can be assumed and maintained simply by means of the magnetic force, which can be generated by the permanent magnets (21) and by the motor winding (20) of the drive motor (2).

The rotating drives of the essentially cylindrical treatment brushes (52, 55) may also be formed by a drive motor (2) or by a washing installation drive (1) according to the present disclosure, especially by the modular drive unit (7) with a uniform construction form.

Figure 3:
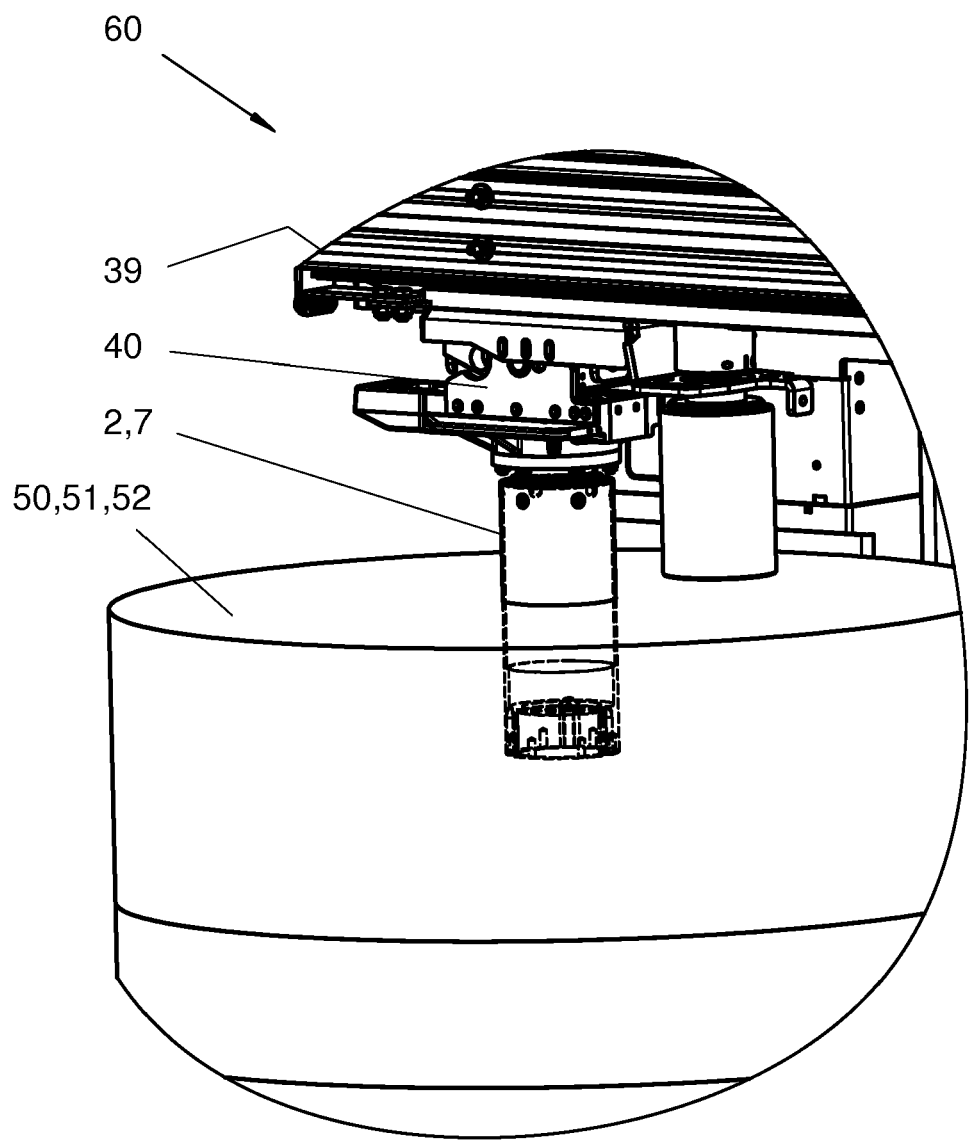
FIGS. 3 through 6 are perspective views showing preferred embodiments of apparatus constituent parts of a treatment installation, which have each a modular drive unit with a uniform construction form.

The drive motor (2) or the washing installation drive (1) may especially preferably be configured as a gearless direct drive, especially for one of the essentially cylindrical treatment brushes (51, 52, 55) mentioned or for an essentially disk-shaped treatment brush (56), for a blower (58) of a drying device (57) or for a traveling mechanism (68) of the treatment installation (60). An especially preferred configuration of a rotating drive is shown in FIGS. 2 and 3. The drive motor (2) or the modular drive unit (7) is integrated here into a brush tube (31) of a side washing brush (52). The brush tube (31) can be pushed here especially over the cylindrical outer contour (23) of the drive motor (2). The cylindrical outer contour (23) may be formed here especially by a housing of the drive motor (2) and especially of the external rotor (4). The brush trim may be present between the brush tube (31) and the drive motor (2). An especially great working height of the side washing brush (2) can thus be achieved. It is, in particular, unnecessary to provide an intermediate space for accommodating the drive motor (2) between an upper end of the side washing brush (52) and a portal cross arm (63).

The side washing brush (52) may have a single-pivoting device or a double-pivoting device. It may, furthermore, be configured as a single-bent brush or as a double-bent brush.

A single-pivoting device is configured to pivot out a side washing brush (52) or at least an upper brush segment (53) in relation to a vertical direction about a pivot axis, especially in order to adapt the slope of the side washing brush to the slope of a vehicle surface to be cleaned. A double-pivoting device can tilt a side washing brush (52) or at least an upper brush segment (53) correspondingly about two pivot axes in relation to a vertical direction. The pivot axes may be a pivot axis extending in the longitudinal direction of the vehicle and/or a pivot axis extending in the transverse direction of the vehicle (70). As an alternative, any other desired orientations of the pivot axes, especially horizontal orientations, are possible.

A single-bent brush is configured to bend a lower part of the side washing brush (52) in relation to an upper part, so that the upper part and the lower part assume different slope angles in relation to the vertical direction. A single-bent brush has an individual articulation axis for this purpose. A double-bent or multiply bent brush correspondingly has two or more articulation axes. The articulation axes may be especially horizontal axes. According to a first variant, a first articulation axis may extend in the longitudinal direction of the vehicle (70), while a second articulation axis extends in the transverse direction in relation to the vehicle (70). The two articulation axes may be present here in a common center-pivot hinge (15). According to an alternative embodiment, the two articulation axes may have the same orientation, especially an orientation in the longitudinal direction of the vehicle (70), but they may be offset in relation to one another in the horizontal direction, especially at two different center-pivot hinges (15).

Any desired intermediary combinations of the above-mentioned variants are, in turn, possible as an alternative.

One, two or more brush segments (53, 54) arranged at the side washing brush (52) can be adapted to the contour of a vehicle surface to be cleaned by a single or multiple tilting and/or by a single or multiple bending of a side washing brush (52). The tilting and bending movements may be combined in any desired manner. The treatment installation preferably has a contour detection device, which may have any desired, prior-art configuration.

The one or more side washing brushes (52) may preferably be mounted on a rail (39), which preferably extends in the upper area of the portal, especially in the area of a portal cross arm (63), in the transverse direction of the vehicle (70), via one or more traveling trolleys (40). A feeding device for a side washing brush (52) may comprise, for example, a drive roller, which acts on the rail (39). The configuration and the function of the feeding device may essentially correspond to the configuration and the function of the traveling drive (68) according to FIG. 5.

As is apparent from the above-mentioned examples, the treatment installation (60) may preferably have a plurality of washing installation drives (1), whose drive motors (2) drive different apparatus constituent parts (14) of the treatment installation (60). An apparatus constituent part (14) may be driven by an individual drive motor (2) or jointly by a plurality of drive motors (2). The drive motors (2) and/or the washing installation drives (1) preferably have a uniform construction form, especially a uniform size and/or uniform interfaces. Mechanical interfaces, electrical supply interfaces and/or communication interfaces may belong to the uniform interfaces.

The plurality of drive motors (2) with uniform construction form may have each the same performance parameters or preferably different performance parameters. For example, an electric drive (2), which is used to drive a feeding device of a side washing brush (52), may have a lower output power than a drive motor (2) for the traveling mechanism (68). These drive motors (2) may, however, nevertheless have a uniform construction form, i.e., especially a uniform size and/or uniform mechanical interfaces and/or uniform electronic interfaces, etc.

An installation control (59) of the treatment installation (60) is preferably configured to detect and/or automatically to configure an electrical power supply (6) of a connected washing installation drive (1). The performance parameters of the respective drive motor (2) and of the washing installation drive (1) can be stored or may be able to be determined in the power supply (6).

The installation control (59) can preferably communicate with the modular drive units (7) or with the power supplies (6) thereof via a plurality of uniform communication interfaces. The communication interfaces may be formed here especially by a bus system or by a network.

According to a preferred embodiment, two or more drive motors (2) may be provided for jointly moving an apparatus constituent part (14) of a treatment installation (60). These may be especially two or more drive motors (2), which are controlled by a common power supply (6) and to which especially supply currents are applied. Two or more drive motors (2) may especially preferably be provided for jointly moving a treatment element (50), especially a treatment brush (51, 52, 55, 56) or a brush segment (53, 54) or a blower (58). As an alternative or in addition, two or more drive motors (2) may be provided for jointly moving a moving device (64) or a feeding device (65) for a treatment element (50).

A washing installation drive may have two or more drive motors (2), which are energized by a common controllable power supply (6) and can be regulated in terms of the speed and/or the speed of rotation. This is especially advantageous for the joint driving of an apparatus constituent part (14).

A plurality of drive motors (2), which are intended for jointly moving an apparatus constituent part (14), may preferably be synchronized. The synchronization may be brought about by any desired means and it can preferably bring about an adaptation of the respective rotary positions (D) of the drive motors (2).

The synchronization of the rotary positions (D) of the plurality of drive motors (2) makes it possible to apply the same supply currents to these drive motors (2). It may be sufficient in this case to provide a rotary position detection device (11), especially one or more Hall sensors in only one of these drive motors (2). A rotary position detection can be done away with for the other drive motors as a consequence of the synchronization. The regulation of the supply currents, which is carried out for the first drive motor (2) with rotary position detection device (11), also applies to the other drive motors (2), which have no rotary position detection device (11) and especially no Hall sensors, as a consequence of the synchronization and of the establishment of a uniform rotary position (D) for all drive motors (2).

FIGS. 7 and 8 show examples for the arrangement of a plurality of drive motors (2) for jointly driving an apparatus constituent part (14). The plurality of drive motors (2) are arranged all in a cascade (41), i.e., they are arranged one after another in the axial direction and are directly or indirectly connected to one another. In other words, two or more drive motors (2) are arranged in a cascading form in the axial direction and are especially connected each to one another.

In the example according to FIG. 7, two or more drive motors (2) are arranged in a cascading form such that their torques are superimposed to one another. This is achieved by the internal rotors (3) of the drive motors (2) being connected to one another such that they rotate in unison. Especially the respective flange areas (17, 19) of the internal rotors (3) of two adjacent drive motors (2) are connected to one another for this purpose.

Furthermore, the external rotors (4) of the adjacent drive motors (2) may be connected each to the same carrier tube (30), brush tube (31) or to another mounting area of the apparatus constituent part (14) to be driven. The external rotors (4), in particular, may have here an identical angular orientation in relation to the carrier tube (30), to the brush tube (31) or to the mounting area. A mechanical orientation device (66), which ensures that all drive motors (2) in the cascade have the same rotary position (D) at each time, is formed by the respective identical fixation of the external rotors (4) and internal rotors (3).

In the example according to FIG. 8, two or more drive motors (2) are arranged in a cascading form such that their speeds are superimposed. An external rotor (4) of a drive motor (2) is connected for this purpose to an internal rotor (3) of an adjacent drive motor (2). It is possible in this arrangement as well to operate the two or more cascading drive motors via a common power supply (6). Further, it may be sufficient in this case as well to equip only one drive motor (2), especially the drive motor (2) in the cascade head (67), with a Hall measuring device (22) or with another rotary position detection device (11).

In the example according to FIG. 8, a synchronized movement of the drive motors (2) and especially a uniform rotary position (D) can be brought about by a mechanical orientation device (66), which is configured as a gear, especially as a planet gear.

As an alternative to the above-mentioned mechanical orientation devices, a plurality of drive motors (2) can be synchronized for a joint movement of an apparatus constituent part (14) of a treatment installation (60) by an electronically controlled specification or adaptation of the rotary positions (D) of the drive motors (2).

The controllable power supply (6) of a washing installation drive (1) according to the present disclosure may be arranged at any desired location. It may be arranged, especially according to FIG. 1, outside the drive motor (2).

As an alternative and preferably, a controllable power supply (6) may be integrated in a housing (35) or in a mounting body (36) of a drive motor (2). This may be especially a housing (35) or a mounting body (36) of a drive motor (2), which forms the cascade head (67) in a plurality of cascading drive motors (2).

When two or more drive motors (2) are connected to a common power supply (6), each of these drive motors (2) may be connected to the power supply (6) via separate lines. As an alternative, a drive motor (2) may have a main terminal (42) for the power supply of its own and an auxiliary terminal (43) for the power supply for at least one cascading drive motor (2). This is shown schematically as an example in FIG. 8. The power supply can be passed on in this manner from one drive motor (2) to the next.

A configuration of drive motors (2) with a main terminal (42) and an auxiliary terminal (43) may also be suitable if the drive motors (2) drive, according to the example shown in FIG. 2, a plurality of brush segments arranged one after another or other apparatus constituent parts (14) of a treatment installation (60), which are arranged one after another.

The controllable power supply (6) may itself be supplied by any desired form of energy. A controllable power supply (6) preferably has a supply terminal for direct connection to the public power grid, i.e., for example, a supply terminal for 230 V a.c. or for 400 V three-phase current. The controllable power supply (6) preferably has an integrated power pack, which converts the energy supplied into an intermediate circuit energy form. The supply currents, which are to be sent to the one or more connected drive motors (2), can then be generated from the intermediate circuit energy form. It is consequently unnecessary to provide an external power pack to supply, for example, one or more controllable power supplies (6) of the washing installation drives (1) with a special energy form, which is different from the energy form of the public supply grid.

A controllable power supply (6) may have a unidirectional or bidirectional data interface to the installation control (59) of the treatment installation (60), especially a network connection or a bus connection. The controllable power supply (6) can receive at least desired values, especially a desired speed, a desired rotary position and/or a desired torque via a unidirectional data interface.

The controllable power supply may have an internal control or regulation in order to operate the at least one drive motor (2) according to the desired values, especially such that correspondingly determined actual values follow the received desired values.

Furthermore, actual values can be transmitted via a bidirectional data interface from the controllable power supply (6) to the installation control (59). Furthermore, status information or general device parameters can be exchanged between the controllable power supply (6) and the installation control (59) unidirectionally or bidirectionally.

A controllable power supply (6) is especially preferably configured to detect an absolute value of the load torque and/or a change in the load torque at at least one connected drive motor (2). The load torque or the load torque change may be used for the internal regulation in the controllable power supply (6). As an alternative or in addition, the detected load torque or the detected load torque change may be transmitted to the installation control (59).

The uniform construction form of modular drive units (7) according to the present disclosure can be defined by one or more of the following features:
- The drive motor (2) has an internal rotor (3) with a hollow shaft (5);
- The drive motor (2) is configured as a synchronous motor, especially as a brushless DC motor;
- A cavity (8) of a hollow shaft (5) of the drive motor (2) has openings (9, 10) towards both ends, especially at least one front opening and at least one rear opening (9, 10) each in the axial direction (A) of the drive motor;
- An internal rotor (3) of the drive motor (2) has a flange area (17) at at least one axial end, especially a flange area (17, 19) each, which are arranged rigidly in relation to one another, at both axial ends;
- An external rotor (4) of the drive motor (2) has a flange area (18) at one axial end, and especially at exactly one axial end;
- A drive motor (2) can be integrated into a carrier tube (30) of a treatment element (50);
- A drive motor (2) has an external rotor (4) with a cylindrical outer contour (23), wherein the diameter of the cylindrical outer contour (23) is smaller than or equal to the internal diameter of a carrier tube (30) or of a brush tube (31) or of a flanged tube (32) or of a drive roller (34);
- In other words, an external rotor has a cylindrical outer contour (23), which has a predefined fitting in relation to a uniform fastening interface, which is defined for a plurality of apparatus constituent parts (14) of the treatment installation (60), which apparatus constituent part are to be driven;
- The drive motor (2) has a housing (35), which is connected to the external rotor (4), wherein the housing (35) forms especially the majority of the cylindrical outer contour (23);
- The drive motor (2) has a main terminal for its own power supply and an auxiliary terminal (43) for a cascading or next drive motor (2);
- The drive motor (2) is configured as a gearless direct drive for a treatment element (50).

The treatment installation (60) according to the present disclosure preferably has a plurality of drive motors (2) with a uniform construction form, wherein some controllable power supplies (6) are integrated into the housing (35) or into a mounting body (36) of the respective drive motor (2) in at least some of the drive motors (2) with uniform construction form.

A treatment installation (60) according to the present disclosure preferably has, furthermore, a plurality of drive motors (2) with a uniform construction form, which are arranged in a cascade (41). Especially two or more of the cascading drive motors (2) may be operated here by a common controllable power supply (6). This common power supply (6) may especially be integrated into a housing or into a mounting body (36) of at least one drive motor (2) of the cascade (41), especially of the drive motor (2) at the cascade head (67).

Variants of the present invention are possible in different manners. In particular, all the features described, shown, claimed or otherwise disclosed in connection with the embodiment variants may be combined with one another, replaced with one another or omitted as desired.

The controllable power supply according to the present disclosure may bring about a control or regulation of the power, of the speed of rotation or of the rotary position of at least one drive motor (2).

All the disclosed components and apparatus constituent parts of a vehicle treatment installation according to the present disclosure may be used in the known manner in a treatment process for a vehicle (vehicle treatment process), especially in a vehicle washing process.

Special advantages arise for a vehicle treatment process from the disclosed configuration of a wheel washer with the moving device (64) and with the disk-shaped treatment brush. A vehicle treatment process according to the present disclosure may comprise the following steps:
- Feeding of a disk-shaped treatment brush (56) to a vehicle wheel; and
- Joint actuation of a traveling mechanism (68) of the treatment installation as well as of a moving device (64), at which the disk-shaped treatment brush is mounted or guided, such that the disk-shaped treatment brush is guided with an arcing motion, so that an external diameter of the disk-shaped treatment brush (56) is guided essentially tangentially in relation to an external diameter of the vehicle wheel (71) to be treated, and especially tangentially to an external diameter of a rim (72).

Furthermore, special advantages arise for a vehicle treatment process from the configuration of a side washing brush (52), which is shown schematically in FIG. 2, with two or more separately driven brush segments (53, 54), especially according to the configuration explained above.

Various favorable effects can be achieved by the separate driving of the two or more brush segments, which may possibly have separate and especially different washing trims or brush trims. The washing trims or brush trims may have, for example, identical or different lengths and equal or different trimming materials. Further, the brush segments (52, 53) may be configured each with or without a fluid feed.

According to a preferred embodiment, a first brush segment (53), which reaches a side mirror of the vehicle during the treatment of a vehicle, can be driven or moved or is driven at a lower speed of rotation than another brush segment (54) arranged above or under it. An especially gentle treatment, especially washing, of the side mirror can be achieved hereby without having to accept an impairment of the washing results for this on the surrounding surface areas. The specification of the different speeds of rotation can be achieved especially by separate control or regulation of the movement of the brush segment.

According to another preferred embodiment, a first brush segment and a second brush segment (53, 54), which are preferably arranged one above the other, may be driven in opposite directions at a transition area between a front surface and a longitudinal side of a vehicle to be cleaned and/or driven at different speeds. This can likewise be achieved by separate control or regulation of the movement of the brush segments. Prior-art side washing brushes, which have only a single brush segment or at least two identical or jointly driven brush segments, tend to lift off at least locally from the surface of the vehicle in the transition area from a front surface to side face or from a side face to a front surface of the vehicle. The results of the treatment or washing may become insufficient due to the lifting off in the transition area, and especially at the left and right rear edges. The lifting off may be triggered by only a partial area of the side washing brush or only one brush segment having a sufficient or even locally increased force against the surface of the vehicle in the transition area. Due to the interaction between the rotating brush or the essentially statically arranged surface contour of the vehicle in the transition area, the brush may become deflected. The manner and extent of the deflection depend on the configuration of the contact zone, on the rotation direction as well as on the speed of rotation of the side washing brush.

Due to the separate and different specification of a movement of the two or more brush segments, it is possible specifically to counteract the lifting off. For example, at least one brush segment, especially the brush segment that has the highest contact pressure against the surface of the vehicle, can thus be driven at a lower speed of rotation relative to the other brush segments. As an alternative or in addition, at least two brush segments may be moved in mutually opposite rotation directions, so that the forces acting as a result of the contact with the vehicle, which forces generate the lifting off or attraction between the washing brush and the surface of the vehicle, are influenced in a specific manner, especially such that they essentially mutually compensate each other and/or such that a local lifting off of the treatment element from the surface of the vehicle is reduced or avoided. The respective separate and different specification of a speed of rotation for the brush segments may also cause in itself or contribute to a reduction or avoidance of a local lifting off of the treatment element from the surface of the vehicle.

According to another preferred embodiment, which can be used in itself or in any combination with the aforementioned actions, the treatment element may be able to be controlled or may be controlled such that a speed change and/or a reversal of the rotation direction takes place at the two or more brush segments (53, 54) sequentially during a washing process. Prior-art side washing brushes, which have only a single brush segment or at least two identical or jointly driven brush segments, tend to vibrate during the treatment process and especially in the feeding position at the vehicle, and this vibration is directed essentially at right angles to the surface of the vehicle to be treated. Thus, an at least local lifting off of the brush may also be triggered at the time of the reversal of the rotation direction or of a change in the speed of rotation, which may likewise lead to an impairment of the treatment result.

The above-mentioned parasitic effects are reduced or avoided by the sequential change in the speed of rotation and/or of the rotation direction of two or more brush segments (53, 54). In particular, a more uniform kinetic characteristic of the side washing brush and/or an optimized treatment result can be achieved.

The above-mentioned advantages of a separate control or regulation of the rotary movements of at least two brush segments at a side washing brush can arise especially in case of a bent brush, i.e., in case of a side washing brush, which has at least one first brush segment (53), a second brush segment (54) and a center-pivot hinge (15) arranged between them. Moreover, the side washing brush may have at least one additional brush segment, which can preferably likewise be driven separately, and possibly an additional center-pivot hinge. The bent brush may be mounted pivotably about at least one axis in the area of the suspension and possibly have at least one pivot drive, which brings about a controlled pivoting out of the side washing brush in relation to the vertical direction in the longitudinal direction of the vehicle, and/or at least one pivot drive, which brings about a controlled pivoting out of the side washing brush in relation to the vertical direction in the transverse direction of the vehicle.

While specific embodiments of the invention have been shown and described in detail to illustrate the application of the principles of the invention, it will be understood that the invention may be embodied otherwise without departing from such principles.

LIST OF REFERENCE CHARACTERS

1 Washing installation drive
2 Drive motor/washing installation drive motor/synchronous motor/brushless DC motor
3 Internal rotor
4 External rotor
5 Hollow shaft
6 Power supply/common power supply
7 Modular drive unit
8 Cavity
9 First opening/Dorsal opening
10 Second opening/Distal opening
11 Rotary position detection device
12 Media supply
13 Mechanical control device
14 Apparatus constituent part
15 Center-pivot hinge
16 Fastening device/screw
17 Flange area/flange ring/flange plate/bearing flange
18 Flange area/flange ring/flange plate/power take-off flange
19 Flange area/flange ring/flange plate/bearing flange
20 Motor winding
21 Permanent magnets
22 Hall sensor/Hall measurement
23 Cylindrical outer contour
30 Carrier tube
31 Brush tube
32 Flanged tube
33 Washing liquid applicator
34 Drive roller
35 Housing
36 Mounting body
37 Washing liquid passage
38 Bent drive
39 Rail
40 Traveling trolley
41 Cascade
42 Main terminal
43 Auxiliary terminal
50 Treatment element 51 Treatment brush
52 Side washing brush
53 Brush segment
54 Brush segment
55 Roof brush
56 Disk-shaped treatment brush/wheel brush/wheel washing brush
57 Drying device
58 Blower
59 Installation control
60 Treatment installation/Washing installation/Vehicle treatment installation
61 Portal/Basic body
62 Column/Portal column
63 Portal cross arm
65 Feeding device
66 Orientation device
67 Cascade head
68 Traveling mechanism
69 Running rail
70 Vehicle
71 Vehicle wheel
72 Rim
A Rotation axis/Axial direction
D Current rotary position

The invention claimed is:

1. A treatment installation comprising:
treatment installation apparatus constituent parts comprising a driven treatment element for a surface treatment of a vehicle;
a washing installation drive motor for a vehicle treatment installation, wherein the washing installation drive motor is configured as a brushless DC synchronous motor, the washing installation drive motor comprising an external rotor forming a power take-off element;
a further washing installation drive motor for the vehicle treatment installation, wherein the further washing installation drive motor is configured as a brushless DC synchronous motor, the further washing installation drive motor comprising a further motor external rotor forming a further power take-off element, wherein:
the washing installation drive motor and the further washing installation drive motor are modular drive units for driving different treatment installation apparatus constituent parts; and
the modular drive units have a uniform construction form.

2. The treatment installation according to claim 1, wherein one of the washing installation drive motors comprises an internal rotor with a hollow shaft.

3. The treatment installation according to claim 2, wherein a cavity of the hollow shaft has at least one front opening and one rear opening, which are each freely accessible towards both ends, in the axial direction of the one washing installation drive motor.

4. The treatment installation in accordance with claim 1, wherein one of the washing installation drive motors comprises a rotary position detection device comprising at least one of:
an integrated Hall sensor; and
a detection device configured to determine a rotary position of the one washing installation drive motor based on a comparison of momentary supply currents.

5. The treatment installation in accordance with claim 1, wherein one of the washing installation drive motors is configured as a modular drive unit with a uniform construction and configured for driving different apparatus constituent parts of a washing installation.

6. The treatment installation in accordance with claim 1, wherein one of the washing installation drive motors comprises an internal rotor and a internal rotor flange area connected permanently to the internal rotor, wherein the internal rotor flange area projects in an axial direction over the housing of the one washing installation drive motor at one end of the one washing installation drive motor and one of:
only one external rotor flange area of the external rotor is provided at another end; and
each of an external flange area of the external rotor and a further internal rotor flange area of the internal rotor are arranged adjacent to one another in the radial direction and are arranged at another end.

7. The treatment installation in accordance with claim 1, wherein the washing installation drive motor comprises:
a main terminal for a drive motor power supply; and
an auxiliary terminal for the further washing installation drive motor, the further washing installation drive motor being arranged as a succeeding or preceding connected motor stage.

8. The treatment installation in accordance with claim 1, wherein one of the washing installation drive motors comprises an internal rotor, wherein the internal rotor has a respective flange area at both axial ends, each flange area being arranged rigidly in relation to one another.

9. The treatment installation in accordance with claim 1, wherein the external rotor of one of the washing installation drive motors comprises has a flange area at an axial end.

10. The treatment installation in accordance with claim 1, wherein one of the washing installation drive motors comprises an actuator arranged in the hollow shaft, wherein at least one of:
the actuator is configured to be driven directly or indirectly by supply currents or by a magnetic field of the one washing installation drive motor; and
the washing installation further comprises a brake or a blocking device and the actuator is an actuator for actuating the brake or the blocking device.

11. The treatment installation in accordance with claim 1, further comprising controllable power supply as a common power supply connected to each of the washing installation drive motor and the further washing installation drive motor and is configured to regulate each of the washing installation drive motor and the further washing installation drive motor in terms of speed and/or rotational position.

12. The treatment installation in accordance with claim 11, wherein the washing installation drive motor and the further washing installation drive motor jointly move an apparatus constituent part of a treatment installation, wherein the apparatus is at least one of:
a portal;
a treatment element, treatment brush or a brush segment;
a blower; and
a moving device or a feeding device for a treatment element, treatment brush or a brush segment.

13. The treatment installation in accordance with claim 11, wherein the washing installation drive motor and the further washing installation drive motor are synchronized for moving an apparatus constituent part jointly, especially with adaptation of the respective rotary positions of the drive motors.

14. The treatment installation in accordance with claim 11, wherein the further washing installation drive motor is arranged as a succeeding or preceding connected motor stage in the axial direction relative to the washing installation drive motor.

15. The treatment installation in accordance with claim 14, wherein the washing installation drive motor and the further washing installation drive motor have torques superimposed to one another.

16. The treatment installation in accordance with claim 14, wherein the washing installation drive motor and the further washing installation drive motor have speeds of rotation superimposed to one another.

17. The treatment installation in accordance claim 1, wherein the further washing installation drive motor is arranged as a succeeding or preceding connected motor stage in the axial direction relative to the washing installation drive motor and is driven by a controllable power supply.

18. The treatment installation in accordance with claim 1, wherein the washing installation drive motor and the further washing installation drive motor have different performance parameters.

19. The treatment installation in accordance with claim 1, further comprising an installation control with two or more uniform electrical interfaces for connecting the washing installation drive motor and the further washing installation drive motor, wherein the installation control is configured to at least one of to detect and to automatically configure at least one of the washing installation drive motor, and the further washing installation drive motor, or an electrical power supply connected to one or both of the washing installation drive motor and the further washing installation drive motor.

20. The treatment installation for a vehicle treatment installation according to claim 1, in combination with a vehicle treatment installation comprising one or more of a treatment brush, side washing brush, roof brush, wheel washing brush and a drying device.

* * * * *